United States Patent [19]

Smith et al.

[11] 3,977,991

[45] Aug. 31, 1976

[54] MANGANESE-AND-MAGNESIUM-ACTIVATED STRONTIUM SULFIDE PHOSPHORS

[75] Inventors: Arthur Leo Smith, Lancaster; Donnavon David Shaffer, Lititz, both of Pa.

[73] Assignee: RCA Corporation, New York, N.Y.

[22] Filed: Feb. 24, 1975

[21] Appl. No.: 552,166

[52] U.S. Cl. .......................................... 252/301.4 S
[51] Int. Cl.² ........................................... C09K 11/16
[58] Field of Search ................ 262/301.4 S, 301.6 S

[56] References Cited
UNITED STATES PATENTS

| | | | |
|---|---|---|---|
| 2,475,437 | 7/1949 | Stern | 252/301.4 S |
| 2,521,124 | 9/1950 | Miller | 252/301.4 S |
| 2,614,082 | 10/1952 | Smith | 252/301.6 S |

OTHER PUBLICATIONS

Kroge "Some Aspects of the Luminescence of Solids" Elsevier Publ. Co. 1948, pp. 270–273.

*Primary Examiner*—Jack Cooper
*Attorney, Agent, or Firm*—G. H. Bruestle; L. Greenspan

[57] ABSTRACT

Manganese-and-magnesium-coactivated strontium sulfide phosphors are both photoluminescent and cathodoluminescent. The incorporation of small amounts (5 to 1000 ppm) of magnesium into manganese-activated strontium sulfide phosphors shifts the CIE emission color coordinates from about $x = 0.323$ and $y = 0.650$ for the magnesium-free phoshor to about $x = 0.370$ and $y = 0.611$, for the maximum amount of incorporated magnesium.

2 Claims, 3 Drawing Figures

MANGANESE-AND-MAGNESIUM-ACTIVATED STRONTIUM SULFIDE PHOSPHORS

BACKGROUND AND SUMMARY OF THE INVENTION

This invention relates to novel phosphors or luminescent materials that may be used in viewing screens for cathode-ray tubes.

Manganese-activated strontium sulfide phosphors are known to be emitters of visible green light under ultraviolet excitation. These phosphors are also cathodoluminescent. With the improvements in efficiency and the capability of tailoring the emission color as described hereafter, such phosphors could displace presently-used green-emitting phosphors in many applications where photoluminescent or cathodoluminescent phosphors are required.

The novel phosphors consist essentially of strontium sulfide containing about 100 to 3750 ppm (preferably 400 to 600 ppm) manganese and about 50 to 1000 ppm (preferably 100 to 300 ppm) magnesium. The term "ppm" is used herein to mean weight parts of the indicated element per million weight parts strontium sulfide. The effect of incorporating magnesium into manganese-activated strontium sulfide phosphor is to shift the CIE color emission coordinates from about $x = 0.323$ and $y = 0.650$ for phosphors with no incorporated magnesium to about $0.370$ and $y = 0.611$ for phosphors with the maximum amount of incorporated magnesium. The luminescence efficiency is improved with increasing amounts of incorporated magnesium within the limits specified by the invention. Reducing the concentration of manganese in the novel phosphors within the limits specified, shifts the CIE coordinates in the direction opposite to that produced by the incorporation of magnesium.

The phosphors are best made with a triple-firing process that involves firing a starting mixture of purified strontium sulfate at about 900° to 1000°C in a hydrogen atmosphere, then refiring the mixture at about 1000° to 1100°C in a hydrogen-sulfide atmosphere, and then again refiring the mixture at about 1100° to 1200°C in a nitrogen atmosphere. The novel phosphors made by this process are efficient emitters under both cathode-ray and ultraviolet excitation.

DETAILED DESCRIPTION OF THE PREFERRED EMBODIMENTS

Figure 1:
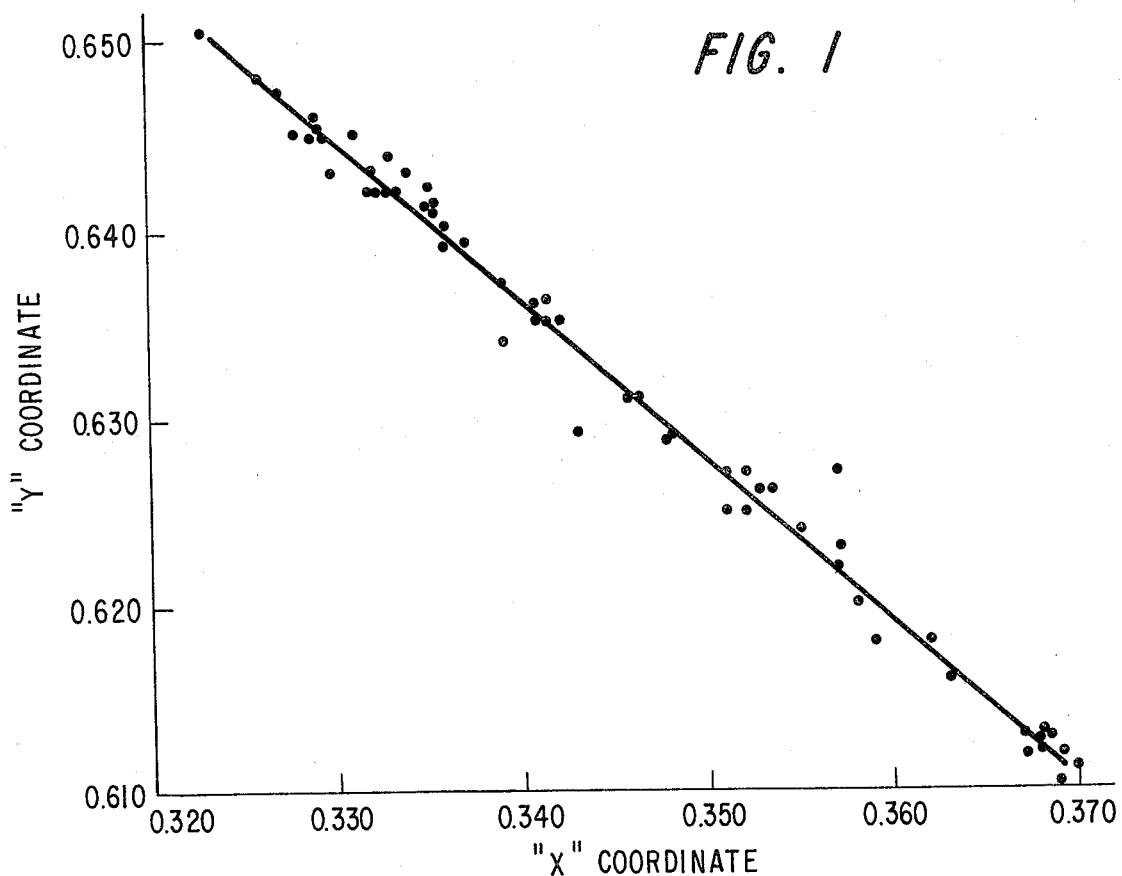
FIG. 1 is a graph plotting the CIE color coordinates of the cathodoluminescence from a large number of phosphor samples without regard for manganese and magnesium concentrations.

The CIE color coordinates of the cathodoluminescence emission from manganese-activated strontium sulfide phosphors can be varied, within limits, by varying the manganese concentration in the phosphor. The color coordinates can be varied further by incorporating small proportions of magnesium into manganese-activated strontium sulfide phosphors. The CIE color emission coordinates vary in a linear way using a wide range of manganese and magnesium contents as shown in FIG. 1. The system starts at $x = 0.323$ and $y = 0.651$ and ends at $x = 0.370$ and $y = 0.611$. For every unit change in $x$, the $y$ value changes by about 0.85, or conversely for every unit change in $y$, $x$ changes by about 1.2. As $x$ increases, $y$ decreases in the mentioned plot.

Figure 2:
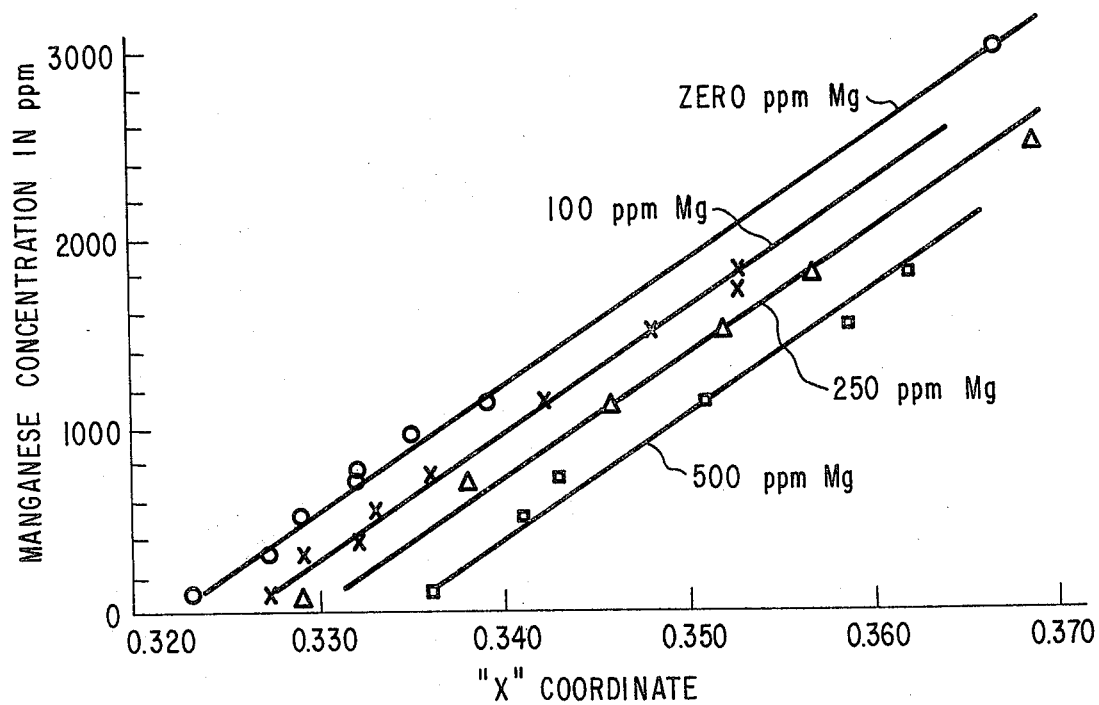
FIG. 2 is a graph plotting the $x$ color coordinate of cathodoluminescence against manganese concentration for phosphor samples with different magnesium concentrations.
Figure 3:
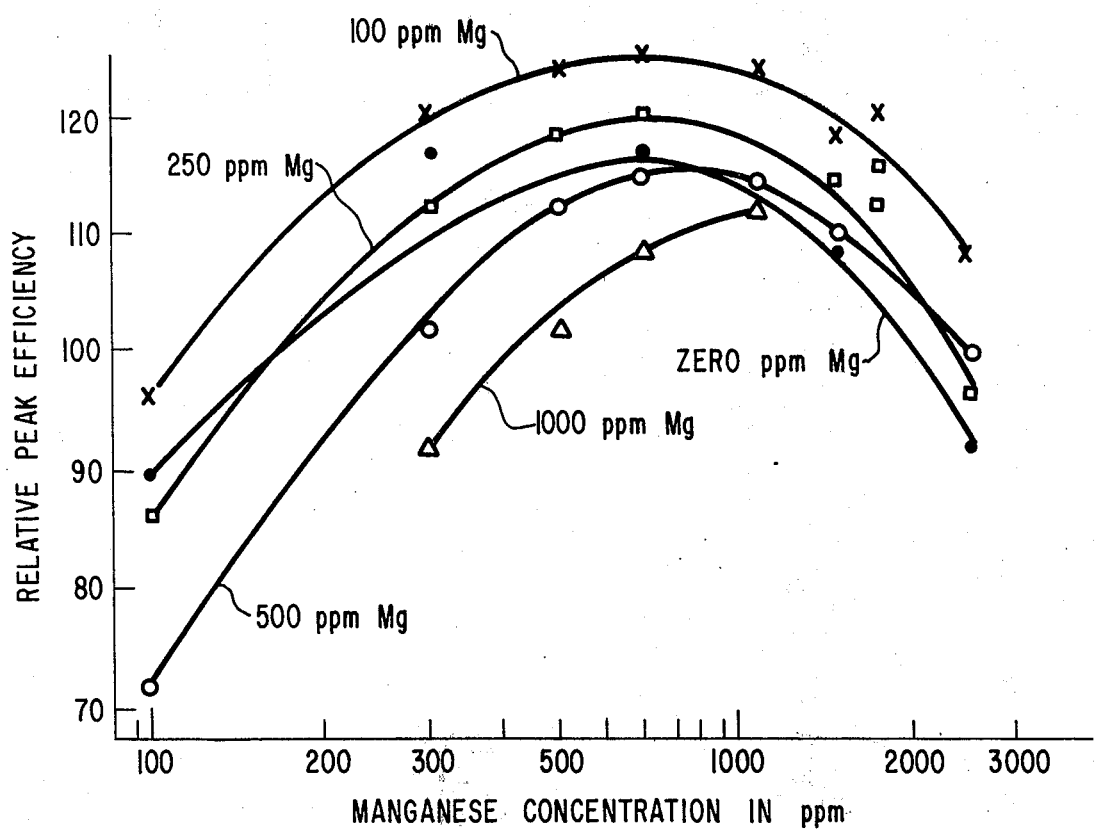
FIG. 3 is a graph plotting the peak cathodoluminescent efficiencies against manganese concentration for phosphor samples with different magnesium concentrations.

FIG. 2 shows how small amounts of incorporated magnesium alter the color coordinates of the cathodoluminescence emission from manganese-activated strontium sulfide phosphors. FIG. 3 shows how the peak cathodoluminescent efficiencies of phosphors in the system are altered by small amounts of incorporated magnesium. Below about 500 ppm addition, increased efficiencies can be obtained. By combining the parameters shown in the FIGURES, the novel phosphors can be designed to provide better efficiencies and tailored color coordinates by careful control of the manganese and magnesium concentrations.

Green-emitting manganese-activated strontium sulfide phosphors and manganese-and-magnesium-activated strontrium sulfide phosphors of high color saturation and high cathodoluminescence efficiency can be prepared by the following procedure. To a highly-purified strontium sulfate, add about 100 to 3750 ppm manganese as a solution of a soluble manganese salt, such as manganese sulfate, and about 0 to 1000 ppm magnesium as a solution of a soluble magnesium salt, such as magnesium nitrate; and then dry the mixture at about 100° to 200°C. The mixture should be substantially free of halide, since halide, when incorporated, produces phosphors whose cathodoluminescent emissions are desaturated in visual color and are of lesser efficiency than the novel phosphors. The following series of firing steps with subsequent coolings to room temperature in a nitrogen atmosphere, have been found to achieve optimum efficiency in the product:
first firing: 1 to 2 hours at about 900° to 1000°C in a hydrogen atmosphere,
second firing: 1 to 2 hours at about 1000° to 1100°C in a hydrogen sulfide atmosphere, and then
third firing: 1 to 2 hours at about 1100° to 1200°C in a nitrogen atmosphere.

The shorter time and lower temperature ends of the ranges can be used for smaller (5 to 10 gram) batches. Two-hundred-gram batches are best fired at the higher end of the time and temperature ranges. The first firing is employed to achieve as pure a strontium sulfide as possible. The reaction proceeds, even under optimum conditions, such that a small quantity of oxide remains in the reaction product. The second firing is for the purpose of converting all the oxide to sulfide and to form a sulfide-rich lattice. The third firing is to remove the excess sulfur from the lattice. During these lattice changes, the manganese seems to be optimumly positioned in the lattice for highest efficiency. For instance, after the first firing in a hydrogen atmosphere, efficiencies between 85 and 90 percent are obtained; after the second firing in a hydrogen sulfide atmosphere, 90-to95-percent efficiencies are obtained; and after the third firing in a nitrogen atmosphere, about 105–120 percent efficiencies are obtained; these efficiencies being in relative units.

The foregoing procedure, used to prepare manganese-activated strontium sulfide phosphors (with no magnesium present), produces phosphors whose CIE color coordinates are substantially constant up to about 100 ppm manganese. Above this concentration, the presence of manganese gradually shifts the emission color coordinates. The color coordinates of a phosphor prepared by this procedure with no magnesium added have the CIE color coordinates of $x = 0.323$ and $y = 0.651$. This highly-saturated emission color, when used in a color television picture tube, permits an increase of about 14 percent in the total color gamut as compared with the presently-used copper-activated zinc-cadmium sulfide phosphor, whose CIE color emission coordinates are $x = 0.354$ and $y = 0.591$.

EXAMPLES

Referring to the Table, add the indicated quantities of manganese as a MnSO$_4$ solution at a concentration of 0.001 gram manganese per ml, and of magnesium as a MgSO$_4$ solution at a concentration of 0.001 gram magnesium per ml to 5.5 grams of high-purity strontium sulfate SrSO$_4$. Dry the mixture at 125°C, cool, and then thoroughly mix in a mortar. Loosely pack a batch of the mixture into a 10-cc quartz crucible. Place the packed crucible in a 2 foot-long quartz firing tube, and then fire for 2 hours in a stream of hydrogen at about 950°C. Cool and then remix the fired mixture in a mortar. Then refire the mixture for about 1 hour in a stream of hydrogen sulfide at about 1100°C. Cool and then remix the refired mixture with a spatula. Refire the mixture for about one hour in a stream of nitrogen at about 1100°C. Then, cool to room temperature.

The firing tube has a closed end and an open end. For each firing, the crucible with the loosely-packed batch is placed at the closed end of the tube, which is eventually heated. The open end of the tube is closed by a rubber stopper which houses an inlet tube and an outlet tube for introducing and exhausting gases into and from the tube during the synthesis of the phosphor. Each firing step is followed with nitrogen flushing while cooling.

Table

| Example No. | Manganese ppm | Magnesium ppm | Efficiency | | CIE Coordinates | |
|---|---|---|---|---|---|---|
| | | | Peak | Visual | x | y |
| 1 | 500 | 0 | 114 | 91 | .329 | .645 |
| 2 | 600 | 100 | 126 | 100 | .336 | .640 |
| 3 | 1500 | 250 | 114 | 95 | .352 | .625 |
| 4 | 300 | 1000 | 92 | 75 | .351 | .627 |

We claim:
1. A phosphor consisting essentially of manganese and magnesium activated strontium sulfide containing 400 to 600 ppm manganese and 100 to 300 ppm magnesium.
2. The phosphor defined in claim 1 prepared by a method including the steps of preparing a mixture of strontium sulfate, manganese as a salt thereof and magnesium as a salt thereof, firing said mixture at about 900° to 1000°C in a hydrogen atmosphere, refiring said mixture at about 1000° to 1100°C in a hydrogen sulfide atmosphere and then again refiring said mixture at about 1100° to 1200°C in a nitrogen atmosphere.

* * * * *

UNITED STATES PATENT OFFICE
CERTIFICATE OF CORRECTION

PATENT NO. : 3,977,991
DATED : August 31, 1976
INVENTOR(S) : Arthur Leo Smith and Donnavon David Shaffer It is certified that error appears in the above-identified patent and that said Letters Patent are hereby corrected as shown below:

Abstract, line 4    change "5" to --50-- column 2, line 63    change "to95" to --to-95--

Signed and Sealed this

Twenty-eighth Day of December 1976

[SEAL]

*Attest:*

RUTH C. MASON
*Attesting Officer*

C. MARSHALL DANN
*Commissioner of Patents and Trademarks*